(12) United States Patent
Aglietti et al.

(10) Patent No.: US 6,381,676 B2
(45) Date of Patent: *Apr. 30, 2002

(54) CACHE MANAGEMENT FOR A MULTI-THREADED PROCESSOR

(75) Inventors: Robert Aglietti, San Jose; Rajiv Gupta, Los Altos, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/732,491

(22) Filed: Dec. 7, 2000

Related U.S. Application Data (62) Division of application No. 09/085,644, filed on May 27, 1998, now Pat. No. 6,205,519.

(51) Int. Cl.[7] .............................................. G06F 12/00
(52) U.S. Cl. ...................... 711/133; 711/129; 711/127; 711/126
(58) Field of Search ................................ 711/125, 119, 711/128, 133, 129, 126, 127, 122, 145; 709/104

(56) References Cited

U.S. PATENT DOCUMENTS

| | | | | |
|---|---|---|---|---|
| 5,535,361 A | * | 7/1996 | Hirata et al. ................ | 711/145 |
| 5,875,464 A | * | 2/1999 | Kirk ............................ | 711/129 |
| 5,909,695 A | * | 6/1999 | Wong et al. ................ | 711/133 |
| 5,918,245 A | * | 6/1999 | Yung ........................... | 711/122 |
| 5,974,438 A | * | 10/1999 | Neufeld ...................... | 709/104 |
| 6,161,166 A | * | 12/2000 | Doing et al. ................ | 711/125 |
| 6,205,519 B1 | * | 3/2001 | Aglietti et al. ............. | 711/133 |
| 6,260,114 B1 | * | 7/2001 | Schug ........................ | 711/129 |

OTHER PUBLICATIONS

Wu et al., "A loop partition technique for reducing cache bank conflict in multithreaded architecture", (c) IEE 1996. pp. 30–36.*

Inohara et al., "Unstable Threads' Kernal Interface for Minimizing the Overhead of thread Switching", (c) IEEE 1993. pp. 149–155.*

* cited by examiner

Primary Examiner—Matthew Kim
Assistant Examiner—B. R. Peugh (57) ABSTRACT

A method and apparatus which provides a cache management policy for use with a cache memory for a multi-threaded processor. The cache memory is partitioned among a set of threads of the multi-threaded processor. When a cache miss occurs, a replacement line is selected in a partition of the cache memory which is allocated to the particular thread from which the access causing the cache miss originated, thereby preventing pollution to partitions belonging to other threads.

13 Claims, 7 Drawing Sheets

CACHE MANAGEMENT FOR A MULTI-THREADED PROCESSOR

This application is a division of Ser. No. 09/085,644 filed May 27, 1998 U.S. Pat. No. 6,205,519.

BACKGROUND OF THE INVENTION

1. Field of Invention

The present invention pertains to the field of computer systems. More particularly, this invention relates to cache management in a multi-threaded processor.

2. Art Background

Computer systems typically include a processor and a memory hierarchy. The memory hierarchy usually includes a main memory that holds instructions and data for the processor. Typically, the processor fetches instructions from the main memory, reads data associated with the instructions from the main memory, executes the instructions, and writes result data back into the main memory.

In addition, the memory hierarchy of a computer system typically includes one or more cache memories. For example, a computer system may include a primary cache which is also known as a level one (L1) cache. The primary cache is usually tightly integrated with the processor and may be contained on the same integrated circuit as the processor. A computer system may also include a secondary cache which is also known as a level two (L2) cache. The secondary cache is usually further down the memory hierarchy between the primary cache and the main memory.

A typical cache memory is a relatively small and fast memory that holds blocks of instructions and/or data obtained from the main memory. A block of instructions or data held in a cache memory may be referred to as a cache line or a data line. A cache memory usually provides a processor with relatively fast access to data lines contained therein in comparison to the time required to obtain the same data line from the main memory. As a consequence, a cache memory if managed efficiently can greatly increase the throughput of a processor by providing fast access to instructions and/or data.

Typically, a processor obtains a particular data line by issuing an address for the particular data line. The primary cache usually performs a lookup operation in response to the address to determine whether the particular data line is contained therein. If the particular data line is not contained in the primary cache, a condition known as a cache miss to the primary cache, then the address of the particular data line is propagated down to a lower level of the memory hierarchy. This usually results in a lookup operation in the secondary cache or a read memory operation in the main memory. In either case, the particular data line is eventually returned from the lower level of the memory hierarchy and it is usually placed into the primary cache. This process may be referred to as a cache fill operation and the particular data line may replace another data line already stored in the primary cache.

In addition, the processor employed in a computer system may be a multi-threaded processor. A multi-threaded processor is a processor that switches execution among multiple threads. A thread may be defined as a stream of addresses associated with the instructions and data of a particular sequence of code that has been scheduled within the processor.

One advantage of a multi-threaded processor is that it can switch threads and continue instruction execution during a long latency operation such as a cache fill operation. This usually provides an overall increase in throughput particularly when a missing data line must be obtained from the main memory.

Nevertheless, conditions may exist in a computer system having a multi-threaded processor that cause the primary cache to be largely overrun by the data lines associated with a particular thread. Such a condition may be referred to as cache pollution and may slow the execution of threads other than the particular thread.

For example, consider a multi-threaded processor that switches between threads A and B. Now consider that a cache miss to the primary cache occurs during execution of thread A, and that a cache miss to the secondary cache occurs, and that the missing data line must be obtained from the main memory during a cache fill operation. Now consider that during the cache fill operation, which typically takes a relatively long time in comparison to the speed of the primary and secondary caches, the processor begins executing thread B. Consider also that thread B happens to be associated with data lines contained in the secondary cache. Under such conditions, the primary cache can become polluted with the data lines associated with thread B as misses to the primary cache cause large numbers of data lines of the primary cache to be replaced with data lines obtained from the secondary cache during execution of thread B.

Unfortunately, this has the consequence of subsequently causing higher numbers of primary cache misses for thread A which further decreases the throughput for thread A. Moreover, prior primary caches are not managed in such a way as to avoid such cache pollution or to provide a balance between the throughput obtained by the different threads in a multi-threaded processor.

SUMMARY OF THE INVENTION

A method and apparatus is disclosed which provides a cache management policy for use with a cache memory for a multi-threaded processor. The cache memory is partitioned among a set of threads of the multi-threaded processor. When a cache miss occurs, a replacement line is selected in a partition of the cache memory which is allocated to the particular thread from which the access causing the cache miss originated, thereby preventing pollution to partitions belonging to other threads. The partitioning may be static. Alternatively, the partitioning may be dynamic and may be used to control relative throughput associated with the threads.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
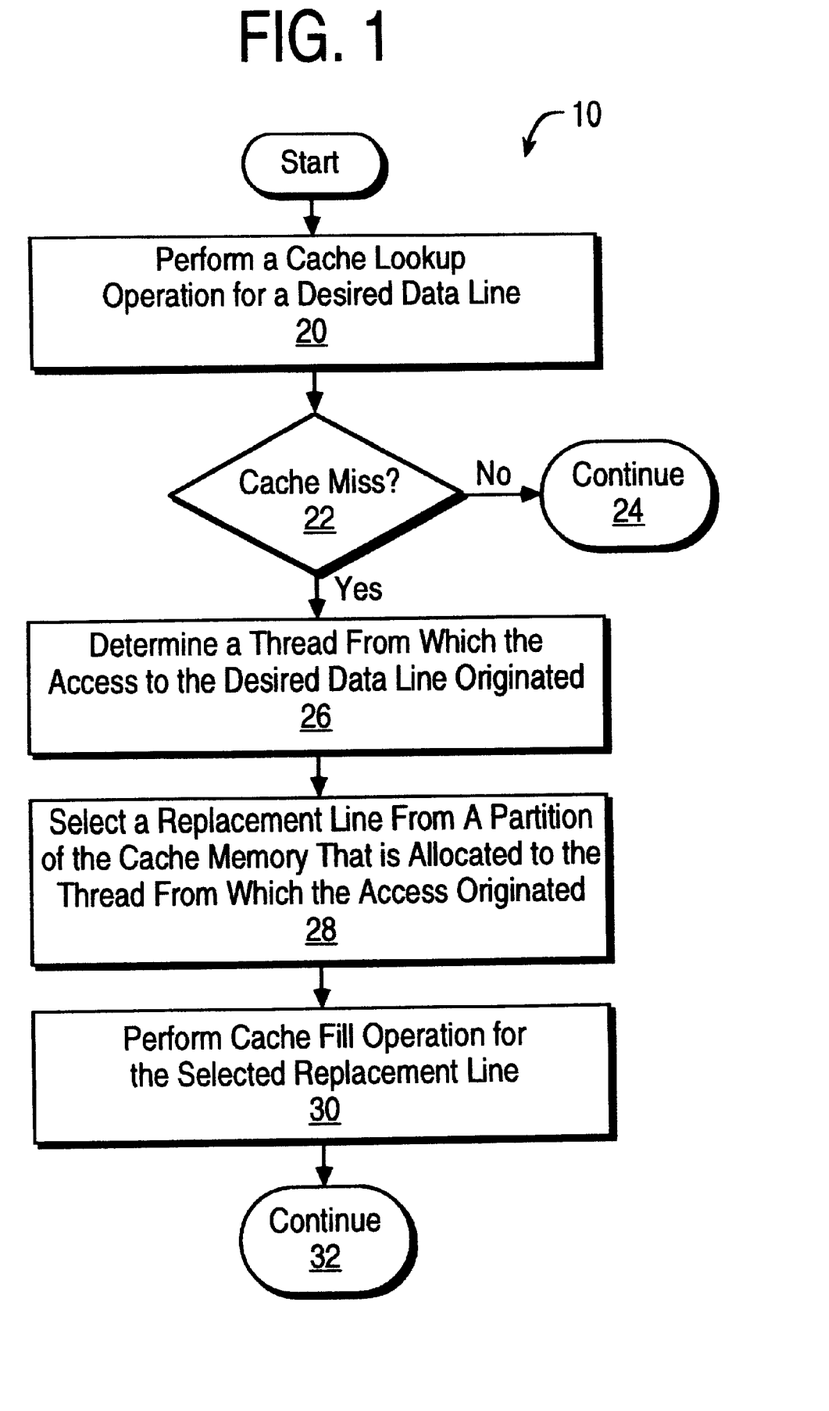
FIG. 1 illustrates a method for managing a cache memory for a multi-threaded processor.

FIG. 1 illustrates a method 10 for managing a cache memory for a multi-threaded processor. The cache memory is subdivided into a set of partitions each of which is allocated to a particular thread of the multi-threaded processor. The partitions of the cache memory may be static, i.e. hard-wired, or the partitions may be dynamic. For example, the cache memory or the multi-threaded processor may contain writeable registers that specify the partitions of the cache memory and the mapping of each partition to the threads of the multi-threaded processor.

The method 10 is undertaken when the multi-threaded processor issues an address for a desired data line. The desired data line may contain instructions or data or instructions and data depending upon whether the cache memory is an instruction cache, a data cache, or a combined instruction/data cache.

At step 20, a cache lookup operation is performed to access the desired data line from the cache memory. If the desired data line is not stored in the cache memory then the cache lookup operation causes a cache miss. If the desired data line is stored in the cache memory then the cache lookup operation causes a cache hit.

At step 22, if a cache miss occurs then control proceeds to step 26. Otherwise, a cache hit occurs and the access of the desired data line continues at step 24.

At step 26, a thread of the multi-threaded processor from which the access to the desired data line originated is determined.

At step 28, a replacement line is selected from a partition of the cache memory that is allocated to the thread determined at step 26. This selection of the replacement line only from the partition allocated to the thread determined at step 26 prevent pollution of partitions of the cache memory that are allocated to other threads.

At step 30, a cache fill operation is performed to obtain the missing desired data line and place the desired data line into the replacement line selected at step 28.

Figure 2A:
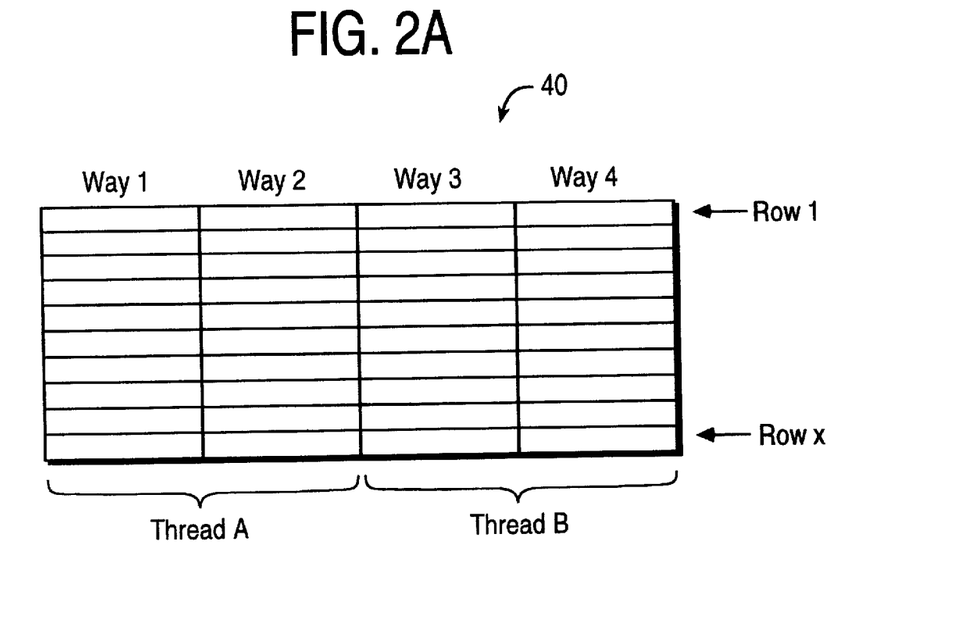
FIGS. 2a–2b show example partitions of a cache memory which is a 4-way cache.
Figure 2B:
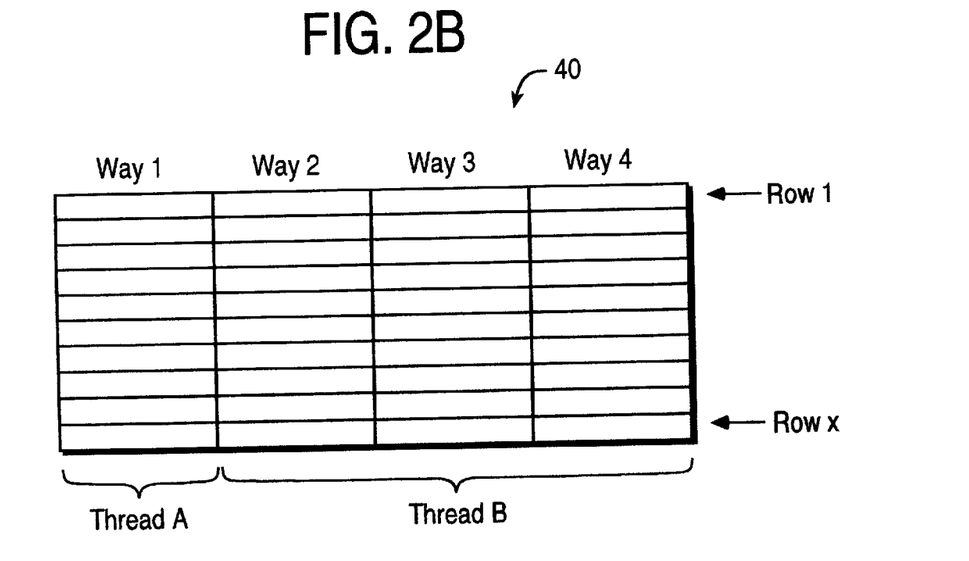

FIGS. 2a–2b show example partitions of a cache memory 40. In these examples, the cache memory 40 is a 4-way cache and the partitions correspond to the ways of the cache. In general, an n-way cache memory may be partitioned in a variety of arrangements among a set of M threads of a multi-threaded processor.

The cache memory 40 may be an instruction cache, a data cache, or a combined instruction and data cache. The cache memory may be implemented on the same integrated circuit that contains a multi-threaded processor. In addition, the cache memory 40 may be a primary cache of a multi-threaded processor or may be a secondary cache.

FIG. 2a shows an example allocation of ways 1–4 of the cache memory 40 to a set of threads A and B of a multi-threaded processor. In this example, ways 1–2 are allocated to thread A and ways 3–4 are allocated to thread B.

With this example allocation, an access to a data line that originates with thread A causes a replacement line to be selected from either way 1 or way 2 at step 28 upon a cache miss. As a consequence, the cache fill operation at step 30 does not pollute ways 3–4 which are allocated to thread B. Similarly, an access to a missing data line that originates with thread B causes a replacement line to be selected from either way 3 or way 4 at step 28, thereby preventing pollution of ways 1–2 which are allocated to thread A.

FIG. 2b shows another example allocation of ways 1–4 of the cache memory 40 to the threads A and B of a multi-threaded processor. In this example, way 1 is allocated to thread A and ways 2–4 are allocated to thread B. An access to a missing data line that originates with thread A causes a replacement line to be selected only from way 1 at step 28, thereby preventing pollution of ways 2–4 which are allocated to thread B. An access to a missing data line that originates with thread B causes a replacement line to be selected from either way 2, way 3, or way 4 at step 28, thereby preventing pollution of way 1 which is allocated to thread A.

The cache memory 40 includes an array of storage cells that are arranged as a set of rows 1–x. Each row 1–x includes storage cells for each of the ways 1–4. The storage cells for each of the ways 1–4 include storage cells for holding a data line, storage cells for holding tag bits, and storage cells for holding replacement information.

For example, the way 1 storage cells of row 1 include storage cells for storing a corresponding data line, storage cells for storing tag bits for the corresponding data line, and storage cells for storing replacement information for the corresponding data line. In one embodiment, the replacement information is a set of age bits that enable a determination of the age of the corresponding data line as may be utilized if the replacement policy is least recently used (LRU).

Figure 3:
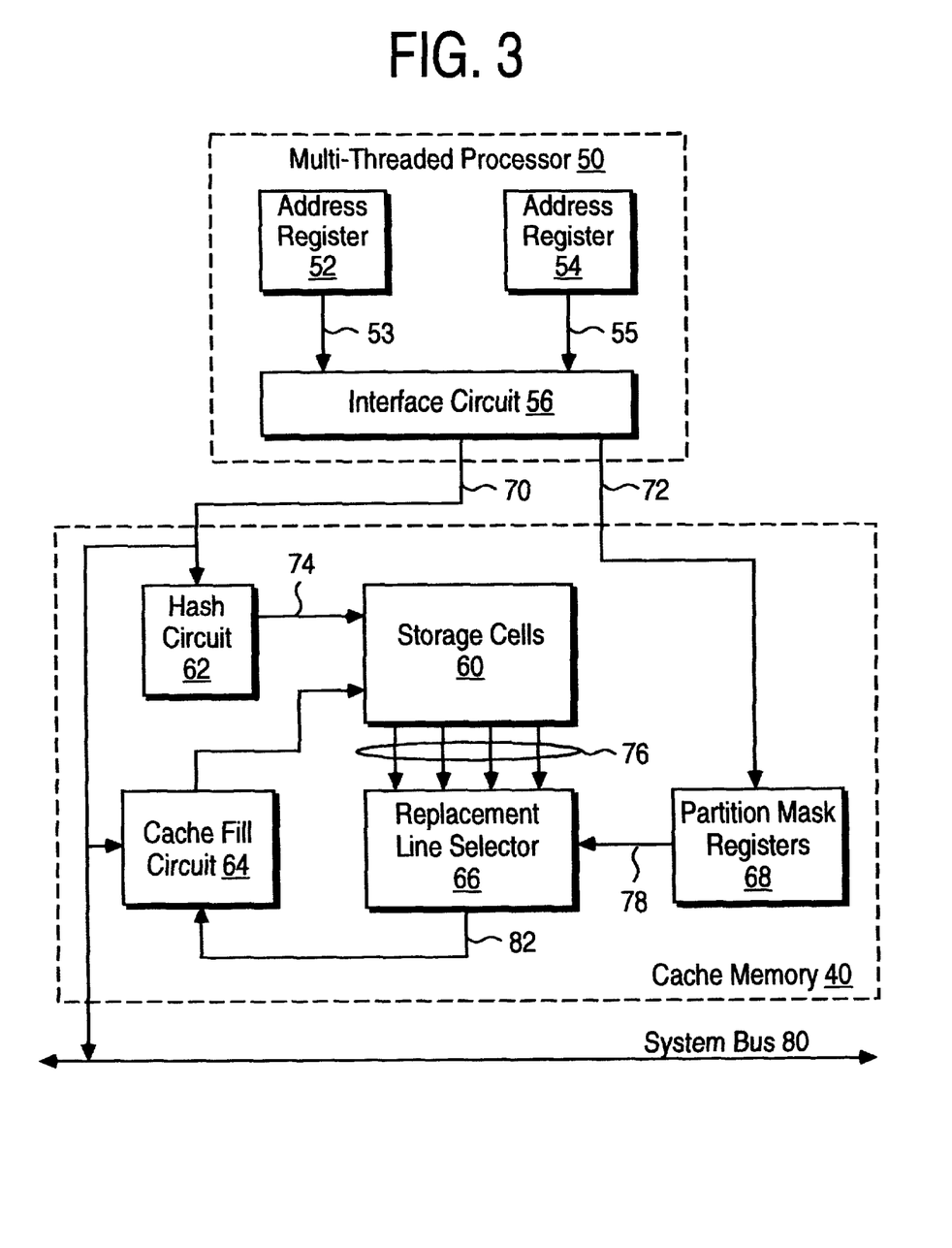
FIG. 3 illustrates an arrangement for partitioning a cache memory among a set of threads of a multi-threaded processor.

FIG. 3 illustrates an arrangement for partitioning the cache memory 40 among a set of threads of a multi-threaded processor 50. In this example, the multi-threaded processor 50 includes a thread A and a thread B. Nevertheless, the techniques illustrated here are easily extended to processors having an arbitrary number of threads. In addition, although the multi-threaded processor 50 is shown with hardware support for multiple threads, i.e. multiple registers sets and specialized processor status, the present techniques are easily adaptable to systems in which multi-threading is implemented in software or firmware.

The multi-threaded processor 50 includes an address register 52 which corresponds to thread A and an address register 54 which corresponds to thread B. The address registers 52–54 may be program counters that hold instruction pointers for fetching the instruction streams associated with threads A and B. Alternatively, the address registers 52–54 may be addressing registers associated with data addressing modes of the multi-threaded processor 50. For example, the address registers 52–54 may be index registers associated with a general purpose register set in that the multi-threaded processor 50 includes a general register set of each of the threads A and B.

The multi-threaded processor 50 includes an interface circuit 56 that passes on either an address 53 from the address register 52 or an address 55 from the address register 54 to the cache memory 40 as a data line address 70. The address passed on to the cache memory 40 depends upon which of the threads A or B is being executed by the processor 50. For example, the processor 50 may include a status register that indicates which of the threads A or B is currently being executed and the interface circuit 56 selects either the address 53 or 55 in response to the contents of that status register.

The cache memory 40 includes a hash circuit 62 that implements a hashing algorithm for converting the data line address 70 into a row index 74. The row index 74 specifies a particular row of the storage cells 60 in which the data line specified by the data line address 70 may be stored. The row index 74 causes that particular row of the storage cells 60 to be read out. The particular row selected by the row index 74 includes 4 sets of replacement information 76. The replacement information 76 includes a set of replacement information for each of the 4 ways, in one embodiment, of the cache memory 40.

If a cache miss on the data line address 70 occurs, then a replacement selector 66 selects a data line in the selected row of the storage cells 60 for replacement. This may be also referred to as nominating a replacement candidate or selecting a replacement line. The data line to be replaced is indicated on a signal line 82.

The replacement line is selected in response to the sets of replacement information 76 and in response to a bit mask 78. The bit mask 78 ensures that the replacement selector 66 nominates only data lines that are allocated to the corresponding thread which caused the cache miss.

The bit mask 78 is provided by a set of partition mask registers 68. The partition mask registers 68 store a bit mask for each of the threads of the multi-threaded processor 50. For example, a thread A bit mask of 1100 indicates that ways 1–2 of the storage cells 60 are allocated to thread A and a thread B bit mask of 0011 indicates that ways 3–4 of the storage cells 60 are allocated to thread B. In another example, a thread A bit mask of 1110 indicates that ways 1–3 of the storage cells 60 are allocated to thread A and a thread B bit mask of 0001 indicates that way 4 of the storage cells 60 is allocated to thread B.

The partition mask registers 68 provide the appropriate bit mask 78 to the replacement line selector 66 in response to an indication 72 from the multi-threaded processor 50. The indication 72 specifies whether it is thread A or thread B that is currently being executed. If it is thread A that is being executed then the bit mask for thread A is provided as the bit mask 78. If it is thread B that is being executed then the bit mask for thread B is provided as the bit mask 78.

The replacement line selector 66 uses the bit mask 78 to determine which of the partitions of the storage cells 60 are to be used in its replacement algorithm. For example, the bit mask 78 of 1100 causes the replacement line selector to use only ways 1–2 in its replacement algorithm.

The replacement algorithm implemented in the replacement line selector 66 may take any form. Possibilities include LRU algorithms as well as random replacement algorithms.

For example, if it is an LRU algorithm then the sets of replacement information 76 include a set of age bits for each of the ways 1–4 of the selected row of the storage cells 60. With the bit mask 78 of 1100, the replacement line selector 66 compares only the age bits of ways 1 2 to determine which is the oldest data line. The replacement line selector 66 then transfers a value of either 1 or 2 on the signal lines 82 to indicate which of the data lines, either way 1 or way 2, of the selected row of the storage cells 60 is the replacement line.

The indication of the selected replacement line on the signal lines 82 is provided to a cache fill circuit 64. The data line address 70 propagates down to a system bus 80 in order to read the missing data line either from a main memory accessible via the system bus 80 or a secondary cache accessible via the system bus 80.

In one embodiment, the allocations of the partitions of the cache memory 40 are static. In this embodiment, the bit masks for threads A and B are hardwired.

In another embodiment, the allocations of the partitions of the cache memory 40 are dynamic. For example, the partition mask registers 68 may be writeable by the execution core of the multi-threaded processor 50. The multi-threaded processor 50 may provide certain privileged instructions for writing bit masks into the partition mask registers 68.

The multi-threaded processor 50 may allocate more partitions to a particular thread in order to increase the throughput performance of that particular thread. In addition, the multi-threaded processor 50 may allocate more partitions to a particular thread in order to balance performance if that particular thread has a low performance.

Figure 4A:
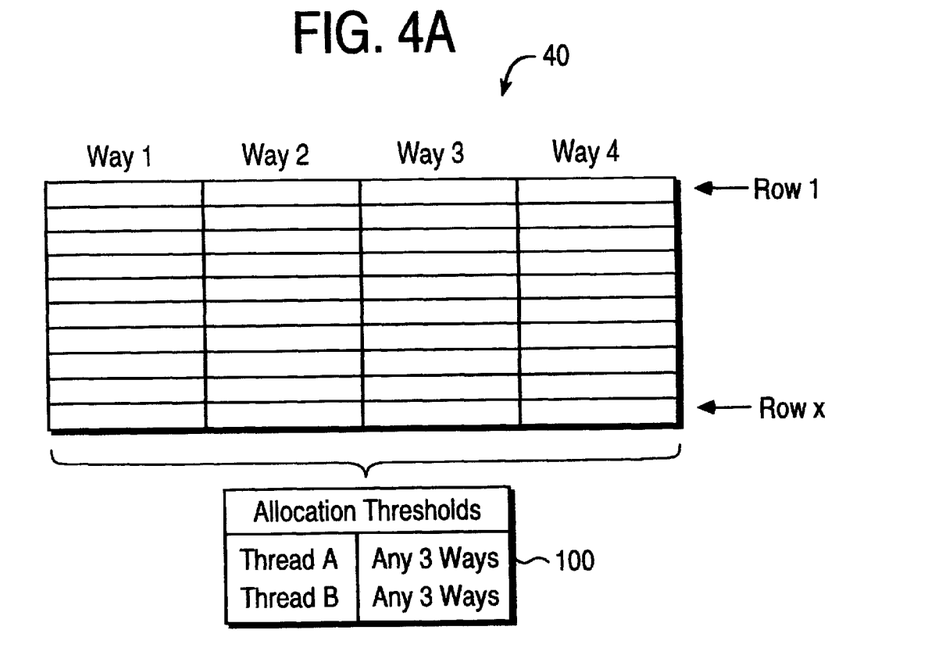
FIGS. 4a–4b show example allocations of ways 1–4 of a cache memory to a set of threads of a multi-threaded processor using allocation thresholds.

FIG. 4a shows another allocation of ways 1–4 of the cache memory 40 to a set of threads A and B of a multi-threaded processor. In this type of partitioning, the allocation of ways 1–4 of the cache memory 40 is defined by a set of allocation threshold values 100. In this example, the thread A has an allocation threshold value equal to 3 which indicates that any 3 and at most 3 of the ways in any row 1–x may be used by thread A. Similarly, the thread B has an allocation threshold value equal to 3 which indicates that any 3 and at most 3 of the ways of any row 1–x may be used by thread B.

With this example allocation, consider an access to a data line that originates with thread A that causes a cache miss. If the particular row 1–x of the cache memory 40 already holds 3 data lines for thread A, then a replacement line is selected from one of those 3 ways already used by thread A according to a replacement algorithm such as least recently used. If the particular row 1 x holds fewer than 3 data lines for thread A, then a replacement algorithm, such as least recently used, is run to select from among all of the ways 1–4 of the particular row 1–x to hold a replacement line.

Similarly, an access to a data line that originates with thread B and that causes a cache miss causes a replacement line to be selected from one of the ways of the cache memory 40 already allocated to thread B if the particular row 1–x already holds 3 data lines for thread B, i.e. thread B is at its threshold. If the particular row 1–x holds fewer than 3 data lines for thread B, then a replacement algorithm selects one of the ways 1–4 of the particular row 1–x to hold a replacement line.

Figure 4B:
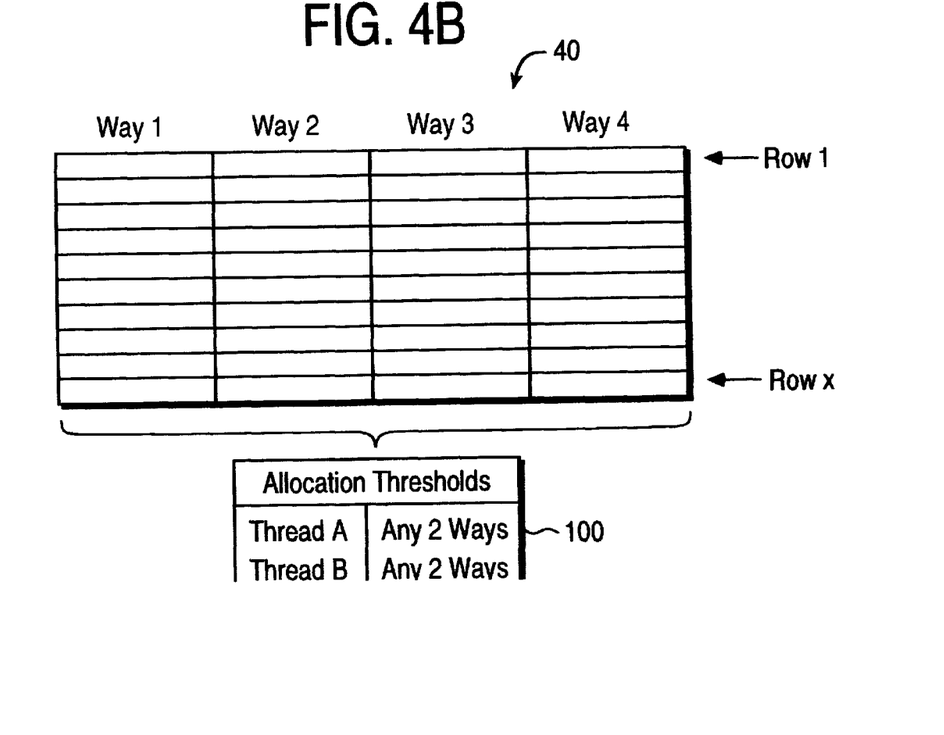

FIG. 4b shows an example allocation of ways 1–4 of the cache memory 40 to a set of threads A–D of a multi-threaded processor as defined by the allocation thresholds 100. In this example, the thread A has an allocation threshold equal to 2 which indicates that any 2 and at most 2 of the ways of the cache memory 40 may be used by thread A. Similarly, the threads B–D have allocation thresholds equal to 2.

Figure 5:
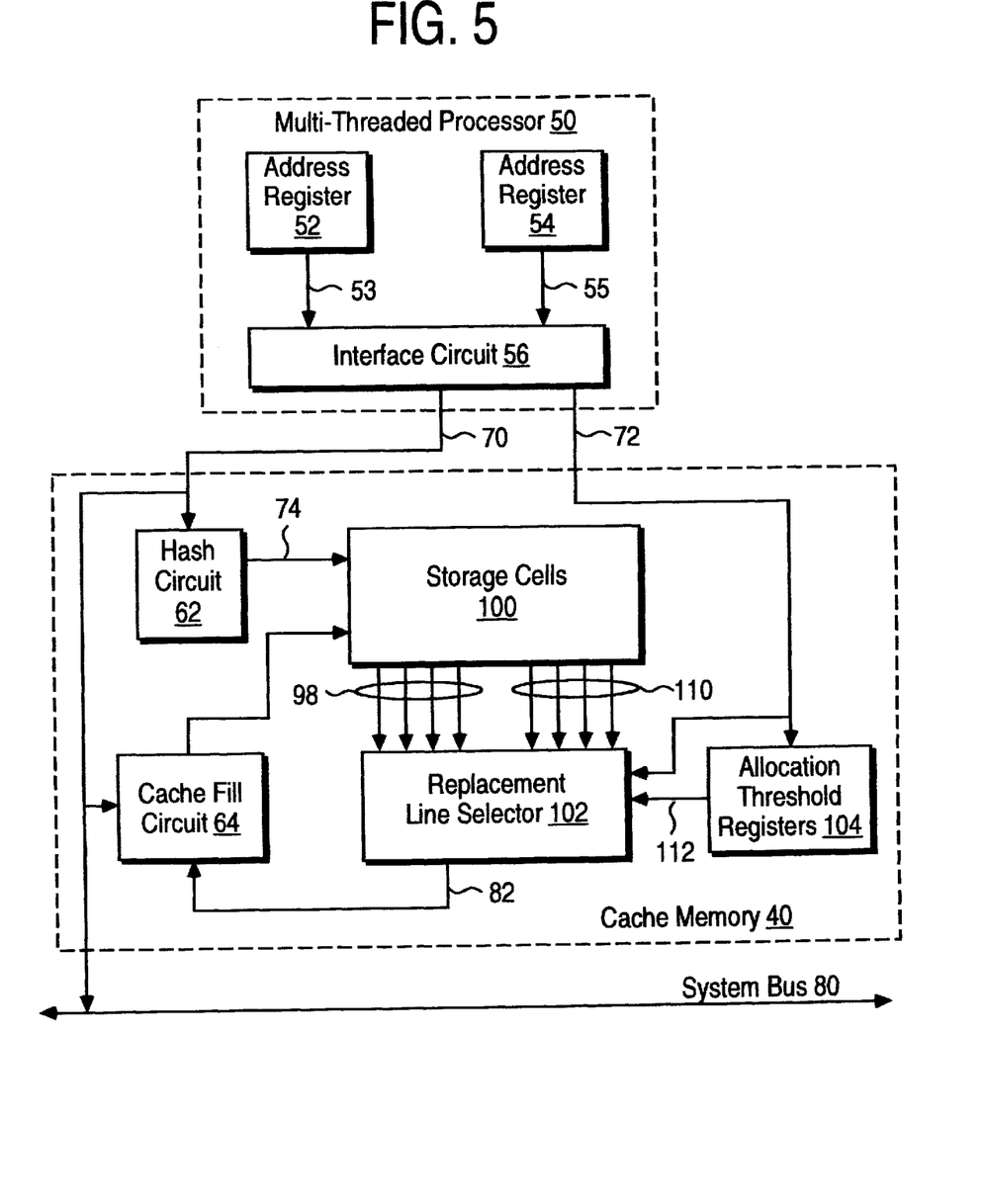
FIG. 5 illustrates an arrangement for partitioning a cache memory among threads of a multi-threaded processor using allocation thresholds.

FIG. 5 illustrates an arrangement for partitioning the cache memory 40 among thread A and thread B of the multi-threaded processor 50 for partitioning defined by the allocation thresholds 100. The multi-threaded processor 50 includes the address register 52 which corresponds to thread A and the address register 54 which corresponds to thread B. In this arrangement, the cache memory 40 includes the hash circuit 62 and the cache fill circuit 64, along with an array of storage cells 100, a replacement line selector 102, and a set of allocation threshold registers 104, as well as other information.

The array of storage cells 100 is arranged as a set of rows 1–x. Each row 1–x includes storage cells for each of the ways 1–4. The storage cells for each of the ways 1–4 include storage cells for holding a data line, storage cells for holding tag bits, storage cells for holding replacement information, as well as storage cells for holding thread identifier information which is used to identify the thread A or B which for which the corresponding data line is held.

As before, the row index 74 specifies a particular row of the storage cells 100 in which the data line specified by the data line address 70 may be stored. The row index 74 causes that particular row of the storage cells 100 to be read out. The particular row selected by the row index 74 includes 4 sets of replacement information 98 and 4 sets of thread identifier information 110. The replacement information 98 includes a set of replacement information for each of the 4 ways of the cache memory 40. The thread identifier information 110 includes a set of thread identifier information for each of the 4 ways of the cache memory 40.

If a cache miss on the data line address 70 occurs, then the replacement selector 102 selects a data line in the particular row of the storage cells 100 being read out for replacement. As before, the data line to be replaced is indicated on the signal line 82. In this arrangement, the replacement line is selected in response to the sets of replacement information 98, the sets of thread identifier information 110, and in response to the indication 72 and a threshold value 112. The threshold value 112 is provided by the allocation threshold registers 104.

The allocation threshold registers 104 store an allocation threshold value for each of the threads of the multi-threaded processor 50. The allocation threshold registers 104 provide the appropriate threshold value 112 to the replacement line selector 102 in response to the indication 72 from the multi-threaded processor 50. The indication 72 specifies whether it is thread A or thread B that is currently being executed. If it is thread A that is being executed then the allocation threshold value for thread A is provided as the threshold value 112. If it is thread B that is being executed then the allocation threshold value for thread B is provided as the threshold value 112.

The replacement line selector 102 uses the thread identifier information 110 to count the number of the ways 1–4 of the particular row being read out that are used by the thread identified by the indication 72. For example, if the indication 72 identifies thread A, then the replacement line selector 102 counts the number of sets of the thread identifier information 110 that also indicate thread A. If the number of sets of the thread identifier information 110 that indicate thread A equals the threshold value 112, then one of the ways of the particular row being read out whose set of thread identifier information 110 indicates thread A is selected for replacement according to a replacement algorithm. If the number of sets of the thread identifier information 110 that indicate thread A is less than the threshold value 112, then any one of the ways of the particular row being read out is selected for replacement according to a replacement algorithm regardless of the thread identifier information 110.

The replacement algorithm implemented in the replacement line selector 102 may take any form. Possibilities include LRU algorithms as well as random replacement algorithms.

The allocation thresholds 100 may be static as when the threshold values for threads A and B are hardwired. The allocation thresholds 100 may be dynamic. For example, the allocation threshold registers 104 may be writeable by the execution core of the multi-threaded processor 50. The multi-threaded processor 50 may provide certain privileged instructions for writing values into the allocation threshold registers 104.

Figure 6A:
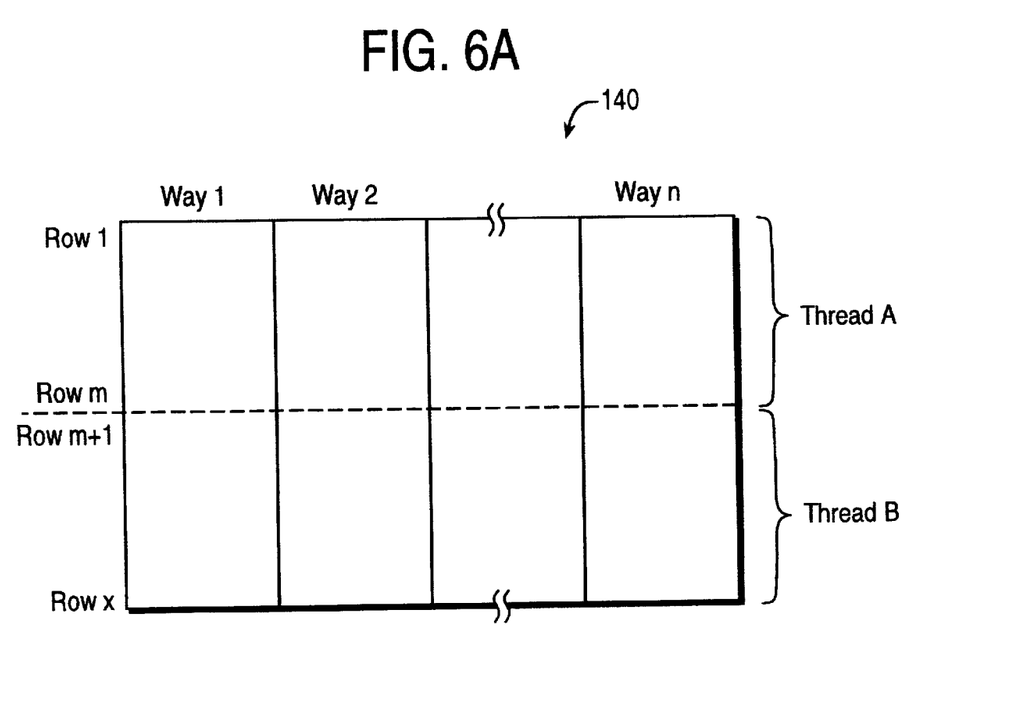
FIGS. 6a–6b show example allocations of partitions of a cache memory based on rows.

FIG. 6a shows an example allocation of partitions of a cache memory 140 to a set of threads A and B of a multi-threaded processor. The cache memory 140 is an n-way cache having a set of rows 1–x. In this example, the partitioning of the cache memory 140 is based on subsets of the rows 1–x. Rows 1–m of the cache memory 140 provide a partition that is allocated to the thread A. Rows m+1 through x of the cache memory 140 provide another partition which is allocated to the thread B. In this example, an equal number of the rows 1–x are allocated to each of the threads A and B.

Figure 6B:
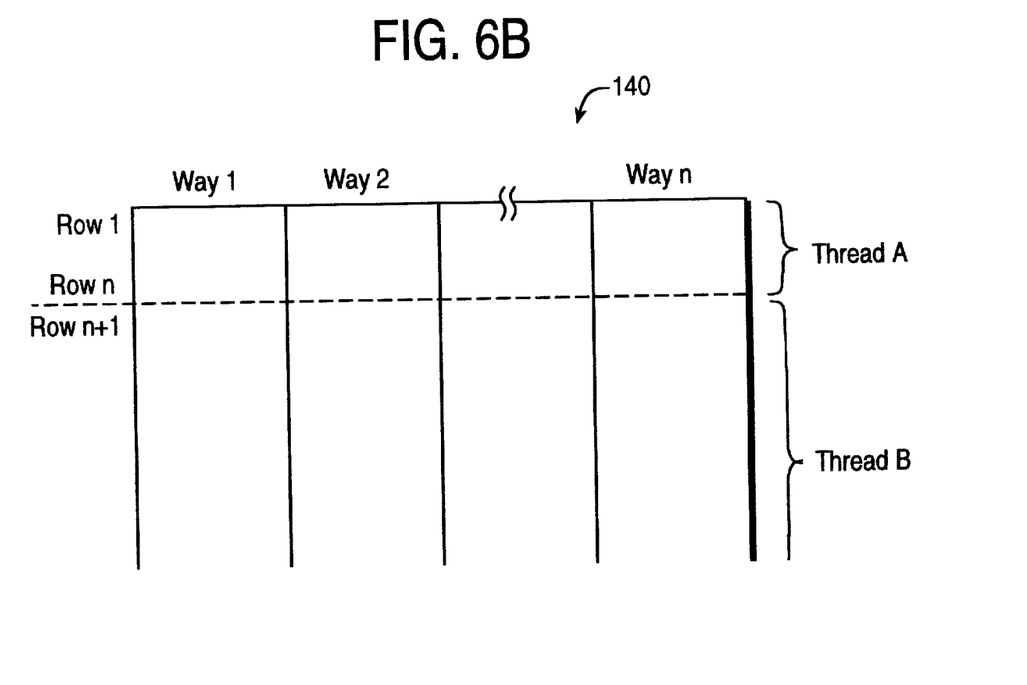

FIG. 6b shows another example allocation of partitions of the cache memory 140 to the threads A and B of a multi-threaded processor. In this example, the majority of the rows 1–x are allocated to the thread B. Rows 1–n of the cache memory 140 are allocated to the thread A. Rows n+1 through x of the cache memory 140 are allocated to the thread B.

Figure 7:
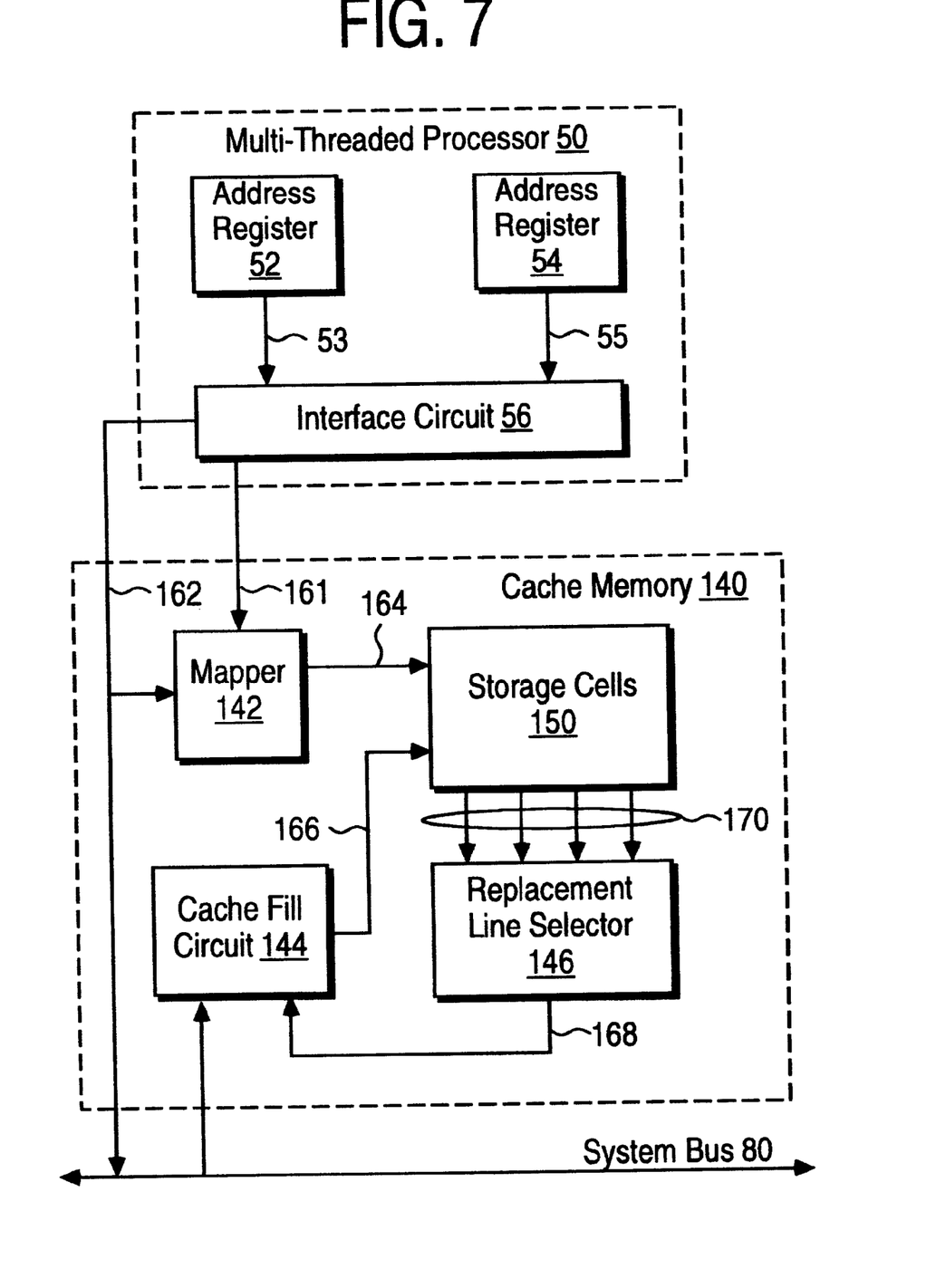
FIG. 7 illustrates an arrangement for partitioning a cache memory among threads of a multi-threaded processor for partitioning based on rows of the cache memory.

FIG. 7 illustrates an arrangement for partitioning the cache memory 140 among thread A and thread B of the multi-threaded processor 50 for partitioning based on subsets of the rows 1–x of the cache memory 140. The multi-threaded processor 50 includes the address register 52 which corresponds to thread A and the address register 54 which corresponds to thread B. The cache memory 140 includes a mapper 142 and a cache fill circuit 144, along with an array of storage cells 150 and a replacement line selector 146. The storage cells 150 are arranged into rows 1–x each of which includes n ways.

The mapper 142 implements a hashing algorithm for converting a data line address 162 from the interface circuit 56 into a row index 164. The row index 164 specifies a particular row of the storage cells 150 in which a data line specified by the data line address 162 may be stored.

The mapper 142 performs the hashing algorithm only on a subset of the rows 1–x of the storage cells 150 which are allocated to the particular thread being executed by the multi-threaded processor 50. An indication 161 from the interface circuit 56 specifies whether it is thread A or thread B that is currently being executed. For the example allocation shown in FIG. 6b, if the indication 161 specifies thread A then the mapper 142 limits the row index 164 to the range 1–n. If the indication 161 specifies thread B then the mapper 142 limits the row index 164 to the range n+1 through x.

The row index 164 causes a particular row of the storage cells 150 to be read out. The particular row selected by the row index 150 includes n sets of replacement information 170. The replacement line selector 146 performs a replacement algorithm to select a particular data line in one of the ways 1–n in the row being read out in response to the replacement information 170. The replacement line selector 146 uses the signal lines 168 to indicate the data line in the storage cells 150 that is to be replaced. The cache fill circuit 144 records this information and writes the missing data line into the storage cells 150 via the signal lines 166 once the missing data line is obtained via the system bus 80.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for managing a cache memory for a multi-threaded processor, comprising the steps of:

partitioning the cache memory into a set of separate partitions and allocating a separate subset of the partitions to each of a set of threads of the multi-threaded processor;

performing a cache lookup operation to the cache memory in response to an access to a data line by the multi-threaded processor;

if a cache miss occurs, then selecting a replacement line in one of the partitions of the cache memory which is allocated to a particular one of the threads from which the access originated wherein the partitioning of the cache memory is dynamic.

2. The method of claim 1, further comprising the step of obtaining the data line and storing the data line into the replacement line selected in the partition.

3. The method of claim 1, wherein the step of partitioning the cache memory includes the step of allocating a subset of a set of ways of the cache memory to each of the threads.

4. The method of claim 3, wherein the step of selecting a replacement line in a partition of the cache memory which is allocated to the particular thread includes the step of selecting the replacement line in one of the subsets of the ways which is allocated to the particular thread.

5. The method of claim 1, wherein the step of partitioning the cache memory includes the step of allocating a subset of a set of rows of the cache memory to each of the threads.

6. The method of claim 5, wherein the step of selecting a replacement line in a partition of the cache memory which is allocated to the particular thread includes the step of selecting the replacement line in one of the rows which is allocated to the particular thread.

7. A computer system comprising:

processor that executes a set of threads;

cache memory including means for dynamically partitioning the cache memory into a set of separate partitions wherein a separate subset of the partitions is allocated to each of the threads such that a cache miss to a data line which is associated with a particular thread causes a replacement line in the cache memory to be selected from one of the partitions of the cache memory that is allocated to the particular thread.

8. The computer system of claim 7, wherein the cache memory is an instruction cache.

9. The computer system of claim 7, wherein the cache memory is a data cache.

10. The computer system of claim 7, wherein the cache memory is a combined instruction and data cache.

11. The computer system of claim 7, wherein the cache memory is an n-way cache memory.

12. The computer system of claim 11, wherein the means for dynamically partitioning the cache memory includes a set of partition mask registers which specify an allocation of the n-ways among the threads.

13. The computer system of claim 12, wherein the partition mask registers are written by the processor to dynamically partition the cache memory.

* * * * *